(12) United States Patent
Ebrahimi et al.

(10) Patent No.: US 9,876,646 B2
(45) Date of Patent: Jan. 23, 2018

(54) USER IDENTIFICATION MANAGEMENT SYSTEM AND METHOD

(71) Applicant: ShoCard, Inc., Palo Alto, CA (US)

(72) Inventors: Armin Ebrahimi, Palo Alto, CA (US); Jeff Weitzman, Palo Alto, CA (US)

(73) Assignee: ShoCard, Inc., Cupertino, CA (US)

( * ) Notice: Subject to any disclaimer, the term of this patent is extended or adjusted under 35 U.S.C. 154(b) by 155 days.

(21) Appl. No.: 15/147,838

(22) Filed: May 5, 2016

(65) Prior Publication Data

US 2016/0330035 A1 Nov. 10, 2016

Related U.S. Application Data

(60) Provisional application No. 62/157,256, filed on May 5, 2015.

(51) Int. Cl.
  *H04L 9/32* (2006.01)
  *H04L 9/16* (2006.01)
  *H04L 9/30* (2006.01)

(52) U.S. Cl.
  CPC .............. *H04L 9/3265* (2013.01); *H04L 9/16* (2013.01); *H04L 9/3066* (2013.01);
  (Continued)

(58) Field of Classification Search
  CPC . H04L 2209/56; H04L 2209/38; H04L 29/06; H04L 29/3247; H04L 63/04;
  (Continued)

(56) References Cited

U.S. PATENT DOCUMENTS 5,005,200 A 4/1991 Fisher
5,901,229 A 5/1999 Fujisaki et al.
(Continued)

OTHER PUBLICATIONS

World_Citizen(2014) , Retrieved Nov. 19, 2017 from http://web.archive.org/web/20150424080215/https://github.com/MrChrisJ/World-Citizenship 2014 (Year: 2014).*
(Continued)

*Primary Examiner* — Brian F Shaw
(74) *Attorney, Agent, or Firm* — Martine Penilla Group, LLP

(57) ABSTRACT

Systems and methods for managing the identity of a user, for managing the identity of the user in a public storage facility, and for certifying pending transactions for a user are disclosed. One example method includes receiving, at an input device, personal data that identifies the user. The personal data is represented as input data. The input device is configured to process a hashing function to provide a hash value and user accessible interface for transmitting the hash value and a public key of the user to the public storage facility, e.g., block chain, and for receiving back from the public storage facility a transaction number corresponding to the hash value and the public key. In one example, the input device is configured to encrypt the hash value, a time stamp and the transaction number with a public key of a certification entity to provide user certifiable data to the certification entity. The certification entity is configured to access the public storage facility to verify the user. Also provided are systems and methods for certifying pending financial transactions, pending debit and/or credit card transactions, and other pending transactions are also disclosed. Systems and methods signing and certifying documents are also disclosed.

18 Claims, 4 Drawing Sheets

(52) U.S. Cl.
CPC .......... *H04L 9/3234* (2013.01); *H04L 9/3236* (2013.01); *H04L 9/3297* (2013.01)

(58) Field of Classification Search
CPC ..... H04L 63/126; H04L 63/0823; H04L 9/30; H04L 9/3236; H04L 9/3297; H04L 9/3247; G06Q 20/065; G06Q 20/3829; G06Q 20/4014; G06Q 20/38215; G06F 21/602; H04W 12/06; H04W 12/10; H04W 12/12

See application file for complete search history.

(56) References Cited

U.S. PATENT DOCUMENTS

| | | | |
|---|---|---|---|
| 6,088,717 | A | 7/2000 | Reed et al. |
| 6,310,966 | B1 | 10/2001 | Dulude et al. |
| 6,792,536 | B1 | 9/2004 | Teppler |
| 8,078,880 | B2 | 12/2011 | Nanda et al. |
| 9,059,858 | B1 | 6/2015 | Giardina et al. |
| 9,135,787 | B1 | 9/2015 | Russell et al. |
| 9,331,856 | B1 | 5/2016 | Song |
| 9,397,985 | B1 | 7/2016 | Seger et al. |
| 2002/0138735 | A1 | 9/2002 | Felt et al. |
| 2004/0064693 | A1 | 4/2004 | Pabla et al. |
| 2005/0039040 | A1 | 2/2005 | Ransom et al. |
| 2005/0091495 | A1 | 4/2005 | Cameron et al. |
| 2005/0114447 | A1 | 5/2005 | Cameron et al. |
| 2007/0016785 | A1 | 1/2007 | Guay et al. |
| 2007/0118479 | A1 | 5/2007 | Halsema et al. |
| 2007/0277013 | A1* | 11/2007 | Rexha ............ G06Q 20/02 711/164 |
| 2008/0155253 | A1† | 6/2008 | Liu |
| 2010/0088517 | A1 | 4/2010 | Piersol |
| 2011/0307703 | A1 | 12/2011 | Ogg et al. |
| 2012/0297464 | A1† | 11/2012 | Busch et al. |
| 2013/0037607 | A1 | 2/2013 | Bullwinkel |
| 2013/0014152 | A1 | 6/2013 | Maino et al. |
| 2013/0333009 | A1 | 12/2013 | Mackler |
| 2014/0006247 | A1 | 1/2014 | Chai et al. |
| 2014/0032913 | A1 | 1/2014 | Tenenboym et al. |
| 2014/0304517 | A1† | 10/2014 | Chidambaram et al. |
| 2015/0081567 | A1 | 3/2015 | Boyle et al. |
| 2015/0095352 | A1 | 4/2015 | Lacey |
| 2015/0244690 | A1 | 8/2015 | Mossbarger |
| 2015/0262138 | A1† | 9/2015 | Hudon |
| 2015/0269614 | A1 | 9/2015 | Kramer |
| 2015/0278820 | A1 | 10/2015 | Meadows |
| 2015/0332283 | A1 | 11/2015 | Witchey |
| 2015/0356523 | A1* | 12/2015 | Madden ............ G06Q 20/065 705/76 |
| 2015/0365436 | A1 | 12/2015 | Shenefiel et al. |
| 2016/0005032 | A1 | 1/2016 | Yau et al. |
| 2016/0012465 | A1 | 1/2016 | Sharp |
| 2016/0028552 | A1 | 1/2016 | Spanos et al. |
| 2016/0072800 | A1 | 3/2016 | Soon-Shiong et al. |
| 2016/0098723 | A1 | 4/2016 | Feeney |
| 2016/0098730 | A1 | 4/2016 | Feeney |
| 2016/0180338 | A1 | 6/2016 | Androulaki et al. |
| 2016/0203572 | A1 | 7/2016 | McConaghy |
| 2016/0212146 | A1 | 7/2016 | Wilson |
| 2016/0217436 | A1 | 7/2016 | Brama |
| 2016/0261411 | A1 | 9/2016 | Yau et al. |
| 2016/0283939 | A1 | 9/2016 | Finlow-Bates |
| 2016/0283941 | A1* | 9/2016 | Andrade ............ H04L 9/3247 |

OTHER PUBLICATIONS

Christoper Ellis, "Create Your Own Blockchain", Oct. 24, 2014, 14 pages.
Drew-Cordell, "Developer Creates Blockchain Passport Technology Based on Bitcoin", Oct. 31, 2014, 16 pages.
Jeremy Kirk, "Could the Bitcoin network be used as an ultrasecure notary service?", May 23, 2013, 3 pages.
John Biggs, "Your Next Passport Could Be on the Blockchain", Oct 31, 2014, 6 pages.
Romain Dillet, "Stampery Now Lets You Certify Documents Using the Blockchain and Your Real Identity", Nov. 20, 2015, 6 pages.
Vinay Gupta, "State in a Box—Identity Services Architecture", 2006-2009, 42 pages.
International Search Report, PCT/16/30863, dated Sep. 14, 2016, 4pages.

\* cited by examiner
† cited by third party

USER IDENTIFICATION MANAGEMENT SYSTEM AND METHOD

CLAIM OF PRIORITY

This application claims priority to and the benefit of U.S. Provisional Patent Application No. 62/157,256 entitled "A User Identification Management System and Method" filed on May 5, 2015, which is incorporated herein for all purposes.

FIELD OF THE DISCLOSURE

The present invention generally relates to systems and methods for managing the identity of users and of identifying those users to third parties.

BACKGROUND

Identity theft causes tens of billions of dollars in losses every year. In an effort to combat identity theft, systems and methods for identifying users to third parties have been developed. In a common two factor application, a user presents a bank card or credit card in addition to the personal identification number ("PIN") corresponding to the card. In other systems, a user provides a password to identify himself or herself. In still other systems, a user may be given challenge questions to verify their identity. Each of these systems, however, is subject to attack and ultimate defeat from a basic security breach.

It would be advantageous to have a more secure system and method for managing the identity of users and of identifying users to third parties.

SUMMARY

Systems and methods for managing the identity of a user, for managing the identity of the user in a public storage facility, and for certifying pending transactions for a user are disclosed. One example method includes receiving, at an input device, personal data that identifies the user. The personal data is represented as input data. The input device is configured to process a hashing function to provide a hash value and user accessible interface for transmitting the hash value and a public key of the user to the public storage facility, e.g., block chain, and for receiving back from the public storage facility a transaction number corresponding to the hash value and the public key. In one example, the input device is configured to encrypt the hash value, a time stamp and the transaction number with a public key of a certification entity to provide user certifiable data to the certification entity. The certification entity is configured to access the public storage facility to verify the user.

In one embodiment, the certification entity uses a device to decrypt the user certifiable data with a private key of the certification entity to recover the hash value, the time stamp and the transaction number. The device of the certification entity is configured to retrieve the hash value from the public storage facility corresponding to the transaction number, compare the recovered hash value to the retrieved hash value, and certify the identity of the user as a function of the recovered hash value being the same as the retrieved hash value.

In some embodiments, the device of the certification entity is further adapted to encrypt the transaction number and the second transaction number with the public key of the certification entity to provide an encrypted certification record. Then, transmit the encrypted certification record to the public storage facility and receive back from the public storage facility a certification transaction number corresponding to the encrypted certification record.

In another embodiment, a system for verifying identity of a user is provided. The system includes an input device for receiving the personal data identifying the user from an identification card to define input data. The input device is configured to execute an encrypting machine that encrypts the input data using a public key of the user, the public key of the user being paired with a private key of the user. The input device is configured to execute a hashing machine for hashing the encrypted input data to provide a hash value. The input device is configured to execute a user accessible interface for transmitting the hash value and the public key to a public storage facility and for receiving back from the public storage facility a transaction number corresponding to the hash value and the public key.

In some embodiments, the encryption machine is adapted to encrypt the hash value, a time stamp and the transaction number with a public key of a certification entity to provide user certifiable data to the certification entity. The certification entity is adapted to decrypt the user certifiable data with a private key of the certification entity to recover the hash value, the time stamp and the transaction number, then retrieve the hash value from the public storage facility corresponding to the transaction number, then compare the recovered hash value to the retrieved hash value, and then certify the identity of the user as a function of the recovered hash value being the same as the retrieved hash value. If the recovered hash value is not the same as the retrieved hash value, then the identity of the user is not certified by the certification entity. In one embodiment, the certifying entity can be a third part that verifies identity data of a user, e.g., the input data. The certifying entity can be a public entity or a private entity.

In some embodiments, the input device is configured to execute an RSA encryption module.

In some embodiments, the identification card is one of a driver license, or a passport, or an employee badge, or a military identification, or a political identification.

In some embodiments, the input device receives the personal data using one of a digital camera, or a scanner, or a smartphone, or a keyboard, or a touchscreen, or voice recognition, or handwriting recognition, or a combination of two or more thereof.

In some embodiments, at least a part of the personal data is coded in a barcode or QR code.

In some embodiments, the input device communicates over a communication link with the public storage facility, the public storage facility being a block chain system that is configured to generate the transaction number.

In some embodiments, the input device is configured to share the transaction number to a certifying machine to enable the certifying machine to perform verification of the identity of the user.

In some embodiments, the certifying machine is configured to transact with the public storage facility to complete at least one operation to process the verification of the identity of the user.

In some embodiments, the input device is configured to receive certification of identify of the user from one or more certifying entities, each certifying entity is configured to perform at least one verification operation against data stored to the public storage facility.

In some embodiments, the input device is one of a smartphone, or a tablet, or an electronic device.

In some embodiments, the public key and the private key are generated using an RSA encryption algorithm or an Elliptic Curve Digital Signature Algorithm (ECDSA).

In some embodiments, the user accessible interface is controllable by the user to provide the transaction number, public key and hash value to a third party.

In some embodiments, the public storage facility is adapted to communicate over the Internet, and the public storage facility comprises a block chain of a bitcoin online payment system.

BRIEF DESCRIPTION OF THE DRAWINGS

Corresponding reference characters indicate corresponding parts throughout the drawings.

DETAILED DESCRIPTION

Figure 1:
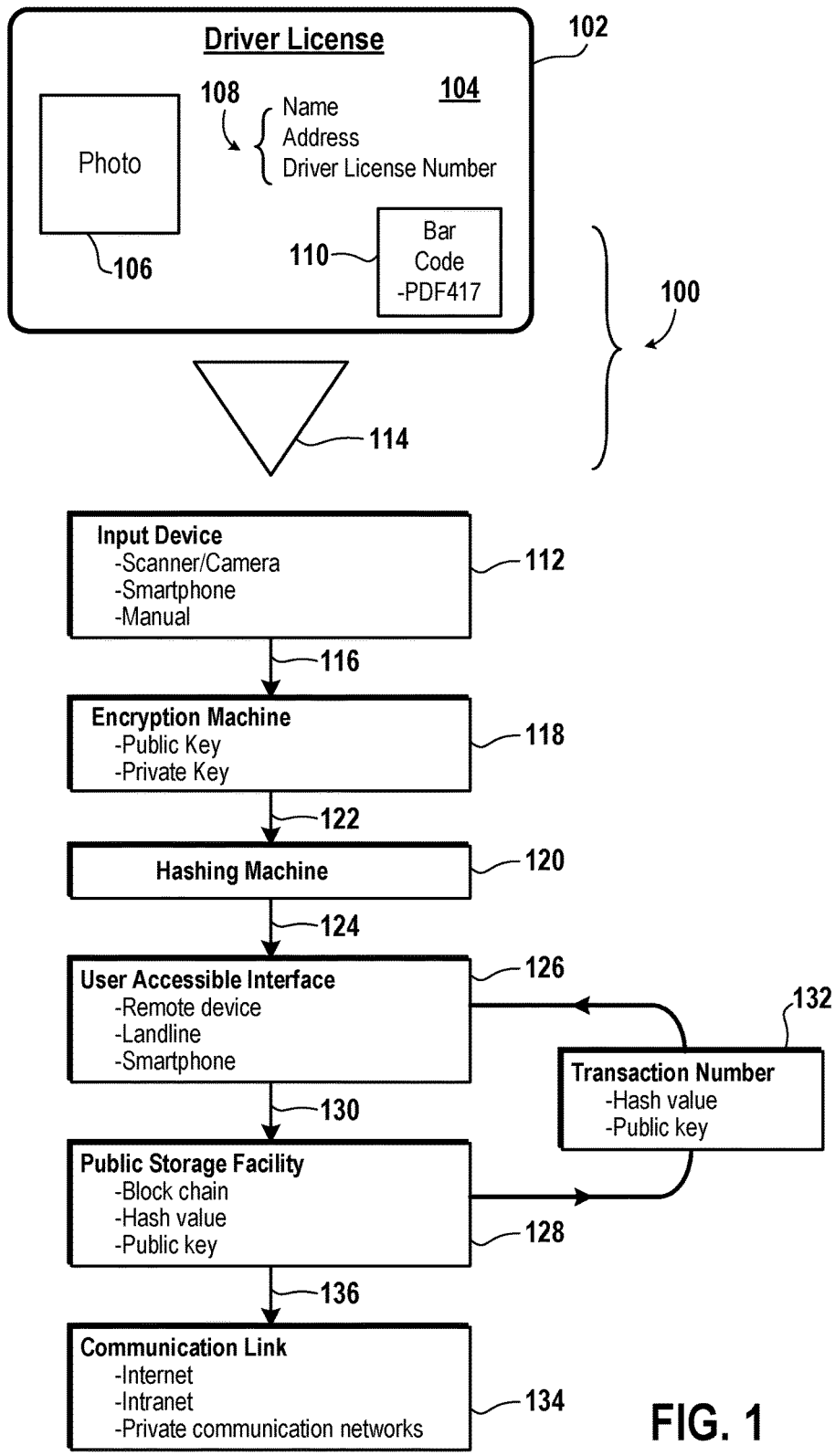
FIG. 1 shows a simplified block diagram of a system and method for sealing an identity of a person in a public storage facility.

FIG. 1 shows a simplified block diagram for a system 100 and method for managing the identity of a user in a public storage facility 128. An identification card 102 contains personal data 104 identifying the user. The personal data can include a photo 106 of the user; the user's name, address and driver license number 108, and/or a bar code 110 or similar computer code for storing, scanning and/or retrieving additional data. Such coding can include PDF417 codes, QR-Codes, and other such codes.

The identification card 102 can be a government issued form of identification such as a driver license, passport, employee badge, military identification, political documentation, or the like. The identification card 102 can also be a privately issued form of identification such as a student ID, library card, social club, or any other form of identification. As indicated by triangle 114, an input device 112 is used to input such personal data from the identification card 102 to provide input data. Input device 112 can take many forms. For example, input device 112 can be a digital scanner, digital camera or smartphone (include the camera commonly found in smartphones) for reading data from the identification card 102 including any codes appearing on the card 102. The input device 112 can also be a device for manually inputting personal data such as a keyboard, touchscreen, voice recognition, handwriting recognition, or other manual input device. The input data collected from the input device 112 is passed to an encryption machine 118 coupled to the input device 112 via a line 116. Encryption machine 118 encrypts the input data with a public key to provide encrypted data. A private key is paired with an associated public key as in conventional when generating such keys using an RSA encryption algorithm, an Elliptic Curve Digital Signature Algorithm (ECDSA), or other encryption algorithm known to those skilled in the art.

A hashing machine 120 is coupled to the encryption machine 118 via a line 122 for hashing the encrypted data to provide a hash value. Hashing machine 120 is also coupled to a user accessible interface 126 via a line 124 and thereby passes the hash value to interface 126. User accessible interface 126 can be any suitable remote device, a smartphone, a tablet, any suitable electronic device, any suitable device connected via a landline, or such other electronic equipment known to those skilled in the art for providing such an interface for accessing the hash value, the public key and the transaction number 132.

The user accessible interface 126 transmits the hash value and the public key to a public storage facility 128 via a line 130, and receives back from the public storage facility 128 a transaction number 132 corresponding to the transmitted hash value and public key. The user accessible interface 126 can be controllable by the user to provide the transaction number 132, public key and hash value to a third party to, for example, establish the identity of the user as more fully explained herein.

The public storage facility 128 is connected to a communication link 134 via a line 136 and can be adapted to communicate over a public computer network, the internet, an intranet, an extranet or any private communication network. The public storage facility 128 can take the form of the block chain in a bitcoin online payment system. The user accessible interface 126 is thus adapted to seal the hash value and public key in the public storage facility 128.

Figure 2:
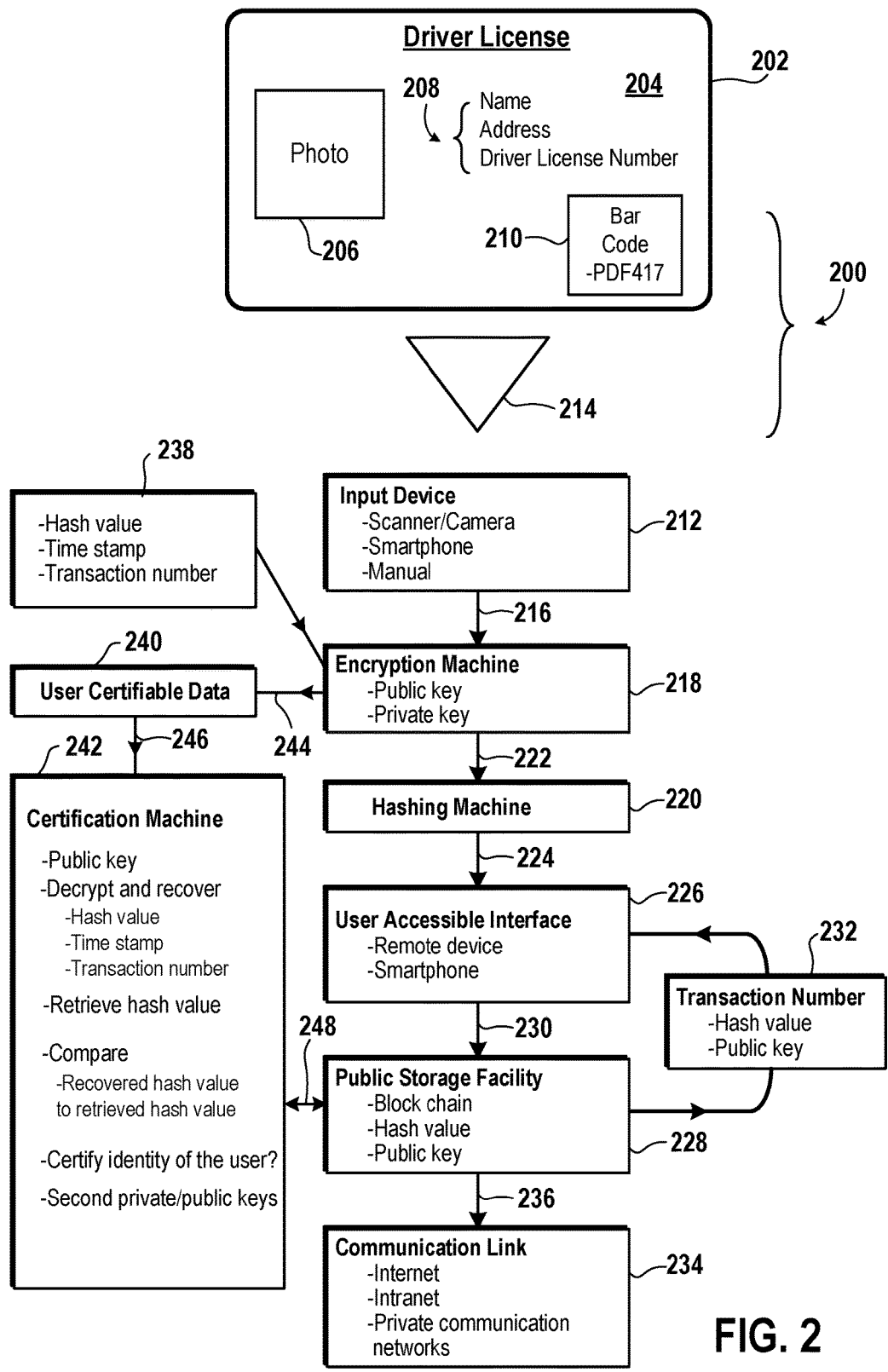
FIG. 2 shows a simplified block diagram of a system and method for certifying an identity of a person.

FIG. 2 shows a simplified block diagram for a certification system 200 and method for managing the identity of a user in a public storage facility 228. Again, an identification card 202 contains personal data 204 identifying the user. The personal data can include a photo 206 of the user; the user's name, address and driver license number 208, and/or a bar code 210 or similar computer code for storing, scanning and/or retrieving additional data. Such coding can include PDF417 codes, QR-Codes, and other such codes.

The identification card 202 can be a government issued form of identification such as a driver license, passport, employee badge, military identification, political documentation, or the like. The identification card 202 can also be a privately issued form of identification such as a student ID, library card, social club, or any other form of identification. As indicated by triangle 214, an input device 212 is used to input such personal data from the identification card 202 to provide input data. Input device 212 can take many forms. For example, input device 212 can be a digital scanner, digital camera or smartphone (include the camera commonly found in smartphones) for reading data from the identification card 202 including any codes appearing on the card 202. The input device 212 can also be a device for manually inputting personal data such as a keyboard, touchscreen, voice recognition, handwriting recognition, or other manual input device.

The input data collected from the input device 212 is passed to an encryption machine 218 coupled to the input device 212 via a line 216. Encryption machine 218 encrypts the input data with a public key of the user to provide encrypted data. A private key is paired with an associated public key as in conventional when generating such keys using an RSA encryption algorithm, an Elliptic Curve Digital Signature Algorithm (ECDSA), or other encryption algorithm known to those skilled in the art.

A hashing machine 220 is coupled to the encryption machine 218 via a line 222 for hashing the encrypted data to provide a hash value. Hashing machine 220 is also coupled to a user accessible interface 226 via a line 224 and thereby passes the hash value to interface 226.

User accessible interface 226 can be any suitable remote device, a smartphone, a tablet, any suitable electronic device, any suitable device connected via a landline, or such other electronic equipment known to those skilled in the art for providing such an interface for accessing the hash value, the public key and the transaction number 232. The user accessible interface 226 transmits the hash value and the public key to a public storage facility 228 via a line 230, and receives back from the public storage facility 228 a transaction number 232 corresponding to the transmitted hash value and public key.

The user accessible interface 226 can be controllable by the user to provide the transaction number 232, public key and hash value to a third party to, for example, establish the identity of the user as more fully explained herein. The public storage facility 228 is connected to a communication link 234 via a line 236 and can be adapted to communicate over a public computer network, the internet, an intranet, an extranet or any private communication network.

The public storage facility 228 can take the form of the block chain in a bitcoin online payment system. The user accessible interface 226 is thus adapted to seal the hash value and public key in the public storage facility 228. As seen in box 238, the encryption machine 218 is also adapted to encrypt the hash value, a time stamp and the transaction number 232 with the public key of the certification machine 242 to provide a user certifiable data 240. The encryption machine 218 is adapted to transmit the user certifiable data 240 to a certification machine 242 via lines 244 and 246.

The certification machine 242 is adapted to decrypt the user certifiable data 240 with the private key of the certification machine 242 to recover the hash value, the time stamp and the transaction number that were initially provided as shown by box 238. The certification machine 242 also uses the recovered transaction number to retrieve the hash value from the public storage facility 228 via a line 248. The certification machine 242 then compares the recovered hash value to the retrieved hash value and certifies the identity of the user as a function of the recovered hash value being the same as the retrieved hash value.

Alternatively, the certification machine 242 could output the recovered hash value and the retrieved hash value to allow a person to make the decision whether to certify the identity of the user. The certification machine 242 may have its own corresponding second private key and public key pair and a second transaction number. The certification machine 242 may then be further adapted to encrypt the transaction number 232 and the second transaction number with the public key of the user to provide an encrypted certification record.

The certification machine 242 may be further adapted to transmit the encrypted certification record to the public storage facility 228 and receive back from the public storage facility 228 a certification transaction number corresponding to the encrypted certification record.

Figure 3:
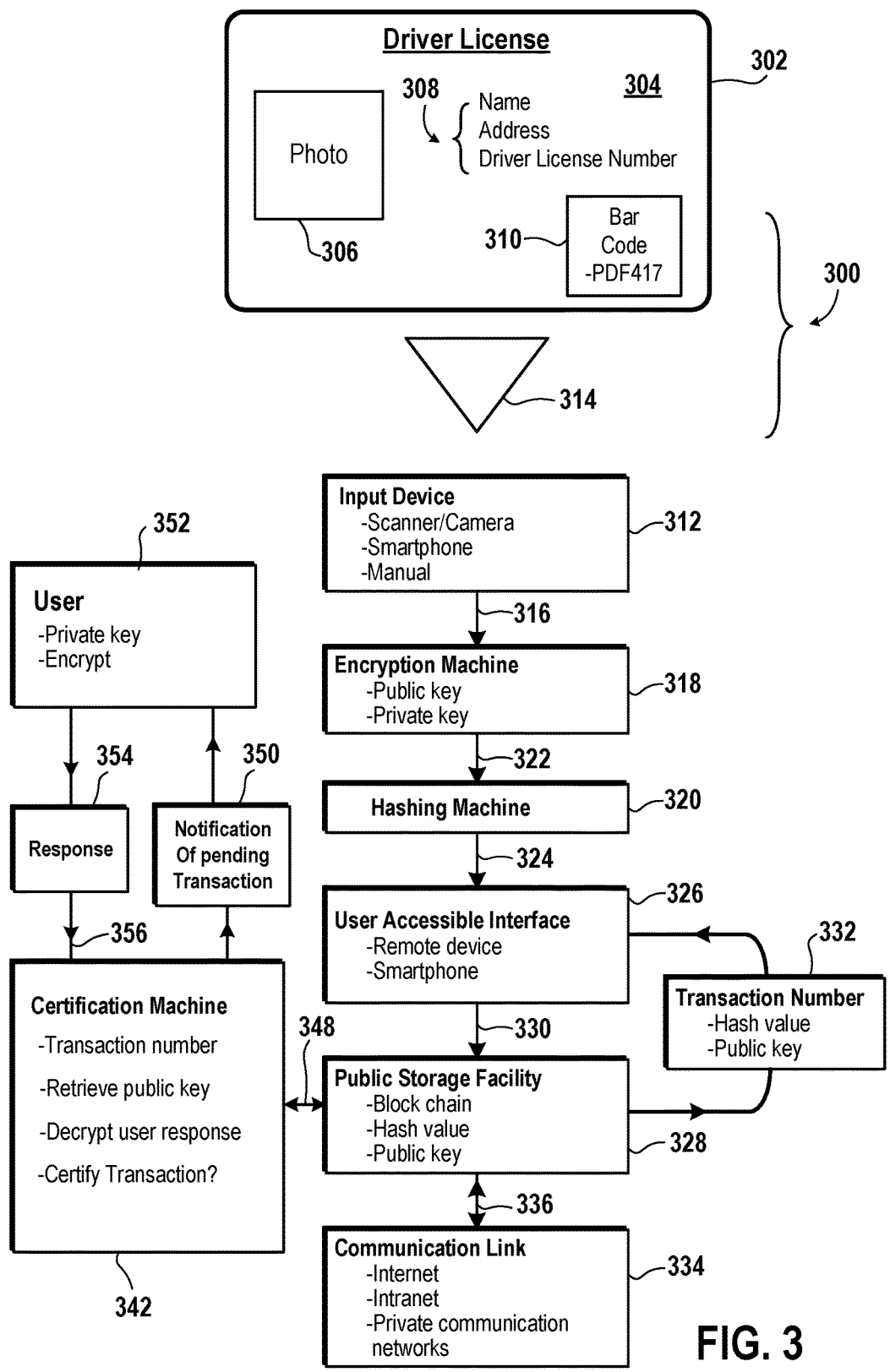
FIG. 3 shows a simplified block diagram of a system and method for certifying a transaction for a person.

FIG. 3 shows a simplified block diagram for a system and method for certifying a pending transaction. Again, an identification card 302 contains personal data 304 identifying the user. The personal data can include a photo 306 of the user; the user's name, address and driver license number 308, and/or a bar code 310 or similar computer code for storing, scanning and/or retrieving additional data. Such coding can include PDF417 codes, QR-Codes, and other such codes.

The identification card 302 can be a government issued form of identification such as a driver license, passport, employee badge, military identification, political documentation, or the like. The identification card 302 can also be a privately issued form of identification such as a student ID, library card, social club, or any other form of identification. As indicated by triangle 314, an input device 312 is used to input such personal data from the identification card 302 to provide input data. Input device 312 can take many forms. For example, input device 312 can be a digital scanner, digital camera or smartphone (include the camera commonly found in smartphones) for reading data from the identification card 302 including any codes appearing on the card 302.

The input device 312 can also be a device for manually inputting personal data such as a keyboard, touchscreen, voice recognition, handwriting recognition, or other manual input device. The input data collected from the input device 312 is passed to an encryption machine 318 coupled to the input device 312 via a line 316. Encryption machine 318 encrypts the input data with a public key of the user to provide encrypted data. A private key is paired with an associated public key as in conventional when generating such keys using an RSA encryption algorithm, an Elliptic Curve Digital Signature Algorithm (ECDSA), or other encryption algorithm known to those skilled in the art.

A hashing machine 320 is coupled to the encryption machine 318 via a line 322 for hashing the encrypted data to provide a hash value. Hashing machine 320 is also coupled to a user accessible interface 326 via a line 324 and thereby passes the hash value to interface 326. User accessible interface 326 can be any suitable remote device, a smartphone, a tablet, any suitable electronic device, any suitable device connected via a landline, or such other electronic equipment known to those skilled in the art for providing such an interface for accessing the hash value, the public key and the transaction number 332.

The user accessible interface 326 transmits the hash value and the public key to a public storage facility 328 via a line 330, and receives back from the public storage facility 328 a transaction number 332 corresponding to the transmitted hash value and public key. The user accessible interface 326 can be controllable by the user to provide the transaction number 332, public key and hash value to a third party to, for example, establish the identity of the user as more fully explained herein.

The public storage facility 328 is connected to a communication link 334 via a line 336 and can be adapted to communicate over a public computer network, the internet, an intranet, an extranet or any private communication network. The public storage facility 328 can take the form of the block chain in a bitcoin online payment system. The user accessible interface 326 is thus adapted to seal the hash value and public key in the public storage facility 328.

A certification machine 342 is adapted to retrieve the public key from the public storage facility 328 via a line 348 as a function of the transaction number 332. The certification machine 342 is further adapted to transmit a notification 350 to the user (shown in block 352) of the pending transaction. The user prepares a response 354 and encrypts the response with the certification machine 342 public key. The certification machine 342 receives the response 354 back from the user via a line 356 and decrypts the user's encrypted response with the private key associated with the certification machine 242.

In this manner and given a successful decryption, the certification machine can certify the pending transaction as a function of said decryption. Alternatively, the certification machine 342 could be set up to allow a person to make the decision whether to certify the transaction. The pending transaction to be certified can be any type of personal, professional, financial, or other type of transaction. For example, the pending transaction can comprise a pending transaction with a financial institution, and the notification can comprise notification to the user of a pending transaction at the financial institution.

The pending transaction can comprise a pending purchase with a credit card or a debit card, and the notification can comprise notification to the user of a pending credit card or debit card transaction. It is seen that the system 300 can comprise an abbreviated system for certifying a pending transaction for a user where the user has a corresponding public key and private key encryption pair.

The system uses the interface 326 for transmitting the public key to the public storage facility 328 and receives back from the public storage facility 328 a transaction number 332 corresponding to the public key. The certification machine 342 is then adapted to retrieve the public key from the public storage facility 328 as a function of the transaction number 332. The certification machine 342 then transmits the notification 350 of the pending transaction to the user 352. The certification machine 342 then receives back from the user a response 354 encrypted with the certification machine 342 public key and decrypts the user's encrypted response with the certification machine 342 private key.

The pending transaction can again be certified as a function of said decryption by either the certification machine 342 or by a person suitably set up to make the decision whether to certify the transaction. Again, the pending transaction to be certified by the abbreviated system can be any type of personal, professional, financial, or other type of transaction. For example, the pending transaction can comprise a pending transaction with a financial institution, and the notification can comprise notification to the user of a pending transaction at the financial institution.

The pending transaction can comprise a pending purchase with a credit card or a debit card, and the notification can comprise notification to the user of a pending credit card or debit card transaction.

Figure 4:
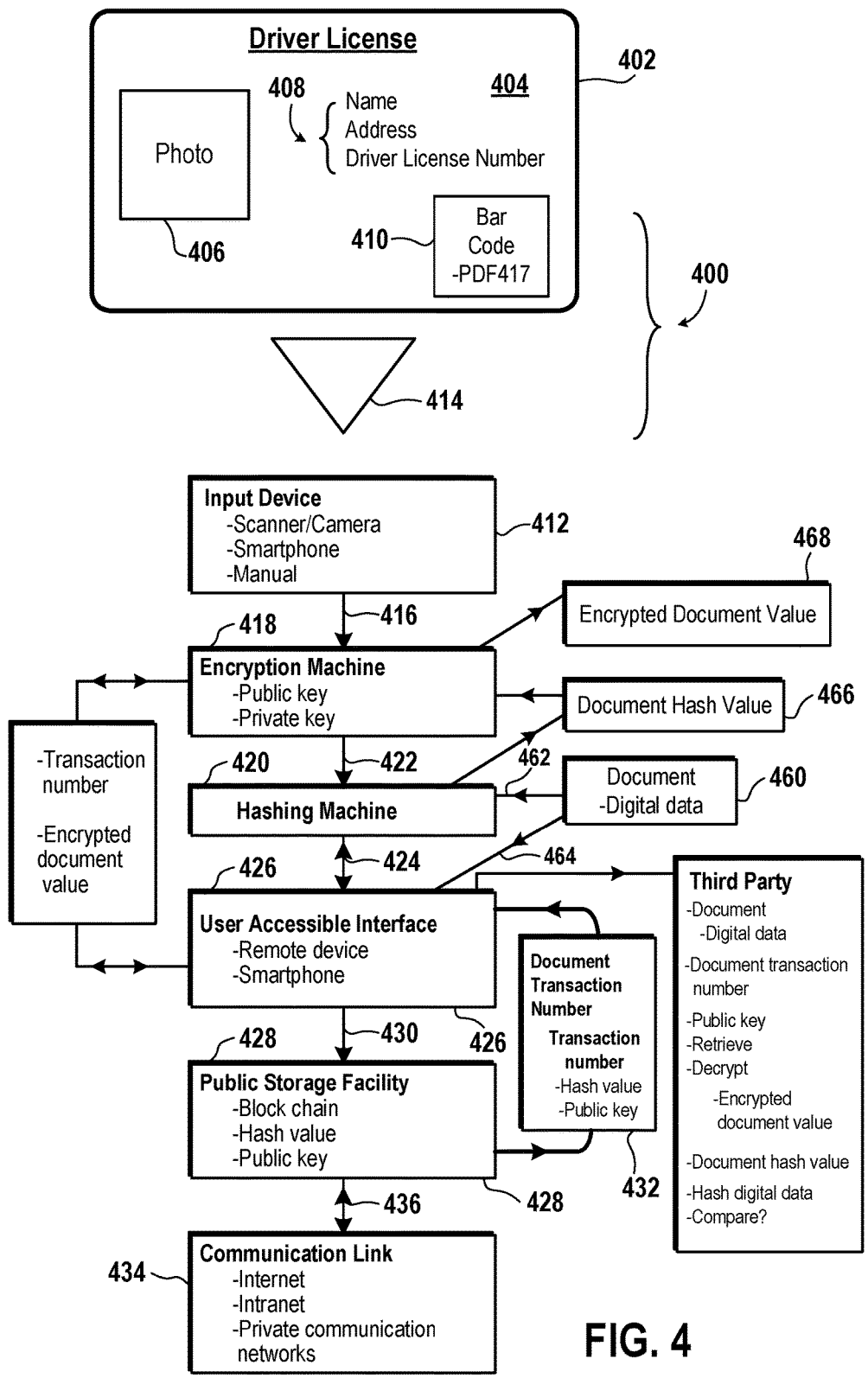
FIG. 4 shows a simplified block diagram of a system and method for signing and certifying a document.

FIG. 4 shows a simplified block diagram for a system and method for signing and certifying a document, the document comprising digital data. Again, an identification card 402 contains personal data 404 identifying the user. The personal data can include a photo 406 of the user; the user's name, address and driver license number 408, and/or a bar code 410 or similar computer code for storing, scanning and/or retrieving additional data. Such coding can include PDF417 codes, QR-Codes, and other such codes. The identification card 402 can be a government issued form of identification such as a driver license, passport, employee badge, military identification, political documentation, or the like.

The identification card 402 can also be a privately issued form of identification such as a student ID, library card, social club, or any other form of identification. As indicated by triangle 414, an input device 412 is used to input such personal data from the identification card 402 to provide input data. Input device 412 can take many forms. For example, input device 412 can be a digital scanner, digital camera or smartphone (include the camera commonly found in smartphones) for reading data from the identification card 402 including any codes appearing on the card 402.

The input device 412 can also be a device for manually inputting personal data such as a keyboard, touchscreen, voice recognition, handwriting recognition, or other manual input device. The input data collected from the input device 412 is passed to an encryption machine 418 coupled to the input device 412 via a line 416. Encryption machine 418 encrypts the input data with a public key of the user to provide encrypted data. A private key is paired with an associated public key as in conventional when generating such keys using an RSA encryption algorithm, an Elliptic Curve Digital Signature Algorithm (ECDSA), or other encryption algorithm known to those skilled in the art.

A hashing machine 420 is coupled to the encryption machine 418 via a line 422 for hashing the encrypted data to provide a hash value. Hashing machine 420 is also coupled to a user accessible interface 426 via a line 424 and thereby passes the hash value to interface 426. User accessible interface 426 can be any suitable remote device, a smartphone, a tablet, any suitable electronic device, any suitable device connected via a landline, or such other electronic equipment known to those skilled in the art for providing such an interface for accessing the hash value, the public key and the transaction number 432.

The user accessible interface 426 transmits the hash value and the public key to a public storage facility 428 via a line 430, and receives back from the public storage facility 428 a transaction number 432 corresponding to the transmitted hash value and public key. The user accessible interface 426 can be controllable by the user to provide the transaction number 432, public key and hash value to a third party to, for example, establish the identity of the user as more fully explained herein. The public storage facility 428 is connected to a communication link 434 via a line 436 and can be adapted to communicate over a public computer network, the internet, an intranet, an extranet or any private communication network.

The public storage facility 428 can take the form of the block chain in a bitcoin online payment system. The user accessible interface 426 is thus adapted to seal the hash value and public key in the public storage facility 428. Box 460 includes the document to be certified and includes the digital data that comprises the document. The document in the form of such digital data can be provided to the hashing machine 420 directly over a line 462. Alternatively, the document in the form of such digital data can be provided to the hashing machine 420 indirectly over lines 464 and 424 via the user accessible interface 426.

The hashing machine 420 is further adapted to hash the digital data to provide a document hash value. As shown, the encryption machine 418 is further adapted to encrypt the document hash value 466 and the transaction number in box 432 with the public key of the third party to provide an encrypted document value 468. The user accessible interface 426 is further adapted to transmit the encrypted document value 468 to the public storage facility 428 and to receive back from the public storage facility 428 a document transaction number (shown in box 432) corresponding to the encrypted document value 468.

The user accessible interface 426 is still further adapted to transmit the document 460 and the document transaction number 432 to a third party. The third party can thereby use the document transaction number 432 and the private key of the third party to retrieve and decrypt the encrypted document value 468 to recover the document hash value 466 and to thereafter compare the retrieved document hash value against a hash value obtained by hashing the digital data comprising the transmitted document.

A match between the retrieved document hash value and the hash value obtained by hashing the digital data comprising the transmitted document shows that no changes have been made to the transmitted document. In an abbreviated form, the system 400 and method for signing and distributing a document to a third party where the document comprises digital data comprises a hashing machine 420 adapted to hash the digital data 460 to provide a document hash value 466.

Encryption machine 418 is adapted to encrypt the document hash value 466 with a public key of the third party to provide an encrypted document value 468. A user accessible interface is adapted to transmit the encrypted document value 468 to the public storage facility 428 and to receive back from the public storage facility 428 a document transaction number 432 corresponding to the encrypted document value 468. The user accessible interface can transmit the document 460 and the document transaction number 432 to a third party.

The third party can again use the document transaction number 432 and obtain the public key of the user, and decrypt the encrypted document value 468 using the private key of the third party to recover the document hash value 466 and to thereafter compare the retrieved document hash value against a hash value obtained by hashing the digital data comprising the distributed document. Having provided this detailed description, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements. In view of the above, it will be seen that the several objects of the invention are achieved and other advantageous results attained. As various changes could be made in the above systems without departing from the scope of the invention, it is intended that all matter contained in the above description and shown in the accompanying drawings shall be interpreted as illustrative and not in a limiting sense.

With the above embodiments in mind, it should be understood that the inventions might employ various computer-implemented operations involving data stored in computer systems. Any of the operations described herein that form part of the inventions are useful machine operations. The inventions also relate to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The inventions can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although example embodiments of the inventions have been described in some detail for purposes of clarity of understanding, it will be apparent that certain changes and modifications can be practiced within the scope of the following claims. For example, the website might host an online retailer or an online publication, instead of a connected-television service. Moreover, the operations described above can be ordered, modularized, and/or distributed in any suitable way. Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the disclosure.

What is claimed is:

1. A system for verifying identity of a user, the system comprising: an input device for receiving the personal data identifying the user from an identification card to define input data;
the input device executing an encrypting machine that encrypts the input data using a public key of the user, the public key of the user being paired with a private key of the user;
the input device executing a hashing machine for hashing the encrypted input data to provide a hash value;
the input device executing a user accessible interface for transmitting the hash value and the public key to a public storage facility and for receiving back from the public storage facility a transaction number corresponding to the hash value and the public key, for said verifying the identity of the user without decrypting the encrypted input data, wherein a receiver of the transmitted input data uses the transaction number and the public key of the user, to perform an encryption of the input data, determining whether the identity is verified.

2. The system of claim 1, wherein the input device is configured to execute an RSA encryption module.

3. The system of claim 1, wherein the identification card is one of a driver license, or a passport, or an employee badge, or a military identification, or a political identification.

4. The system of claim 1, wherein the input device receives the personal data using one of a digital camera, or a scanner, or a smartphone, or a keyboard, or a touchscreen, or voice recognition, or handwriting recognition, or a combination of two or more thereof.

5. The system of claim 1, wherein at least a part of the personal data is coded in a barcode or QR code.

6. The system of claim 1, wherein the input device communicates over a communication link with the public storage facility, the public storage facility being a block chain system that is configured to generate the transaction number.

7. The system of claim 1, wherein the input device is configured to share the transaction number to a certifying machine to enable the certifying machine to perform verification of the identity of the user.

8. The system of claim 7, wherein the certifying machine is configured to transact with the public storage facility to complete at least one operation to process the verification of the identity of the user.

9. The system of claim 1, wherein the input device is configured to receive certification of identify of the user from one or more certifying entities, each certifying entity is configured to perform at least one verification operation against data stored to the public storage facility.

10. The system of claim 1, wherein the input device is one of a smartphone, or a tablet, or an electronic device.

11. The system of claim 1, wherein the public key and the private key are generated using an RSA encryption algorithm or an Elliptic Curve Digital Signature Algorithm (ECDSA).

12. The system of claim 1, wherein the user accessible interface is controllable by the user to provide the transaction number, public key and hash value to a third party.

13. The system of claim 1, wherein the public storage facility is adapted to communicate over the Internet, and the public storage facility comprises a block chain of a bitcoin online payment system.

14. A system for certifying an identity of a user, comprising:
an identification card containing a personal data identifying the user; an input device for inputting the personal data from the identification card to provide input data;
the input device processing an encryption machine to encrypt the input data with a public key of the user to provide encrypted data, wherein a private key of the user is paired with the public key;
the input device processing a hashing machine for hashing the encrypted data to provide a hash value;
the input device processing a user accessible interface for transmitting the hash value and the public key to the public storage facility and for receiving back from the public storage facility a transaction number corresponding to the hash value and the public key; wherein a receiver of the transmitted input data uses the transaction number and the public key of the user, to perform an encryption of the input data, determining whether the identity is verified without decrypting the encrypted input data;
wherein the encryption machine is adapted to encrypt the hash value, a time stamp and the transaction number with a public key of a certification entity to provide user certifiable data to the certification entity, the certification entity is adapted to:
decrypt the user certifiable data with a private key of the certification entity to recover the hash value, the time stamp and the transaction number;
retrieve the hash value from the public storage facility corresponding to the transaction number;
compare the recovered hash value to the retrieved hash value; and
certify the identity of the user as a function of the recovered hash value being the same as the retrieved hash value.

15. The system of claim 14, wherein the certification entity is further adapted to:
encrypt the transaction number and the second transaction number with the public key of the certification entity to provide an encrypted certification record; and
transmit the encrypted certification record to the public storage facility and receive back from the public storage facility a certification transaction number corresponding to the encrypted certification record.

16. The system of claim 14, wherein the input device is configured to execute an RSA encryption module.

17. The system of claim 14, wherein the identification card is one of a driver license, or a passport, or an employee badge, or a military identification, or a political identification, and wherein the input device receives the personal data using one of a digital camera, or a scanner, or a smartphone, or a keyboard, or a touchscreen, or voice recognition, or handwriting recognition, or a combination of two or more thereof.

18. The system of claim 14, wherein the input device communicates over a communication link with the public storage facility, the public storage facility being a block chain system that is configured to generate the transaction number, and the input device is configured to share the transaction number to the certification entity to enable the verification of the identity of the user via the block chain.

* * * * *